(No Model.) 6 Sheets—Sheet 1.

C. B. DAVIS & E. H. RIDDELL.
FILTER.

No. 450,223. Patented Apr. 14, 1891.

Witnesses
W. C. Coolies
A. M. Best

Inventors
Chester B. Davis
Edward H. Riddell
by Coburn & Thacher
Attys

THE NORRIS PETERS CO., PHOTO-LITHO., WASHINGTON, D. C.

(No Model.) 6 Sheets—Sheet 2.
C. B. DAVIS & E. H. RIDDELL.
FILTER.
No. 450,223. Patented Apr. 14, 1891.
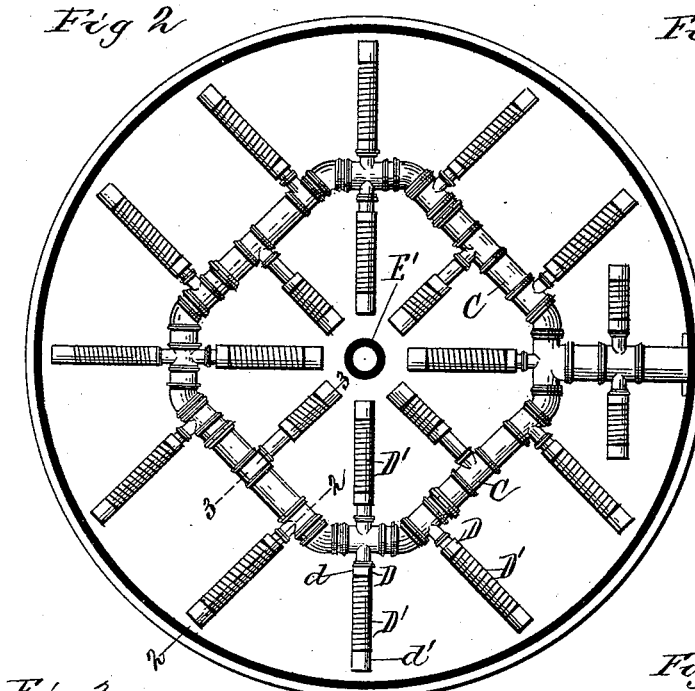
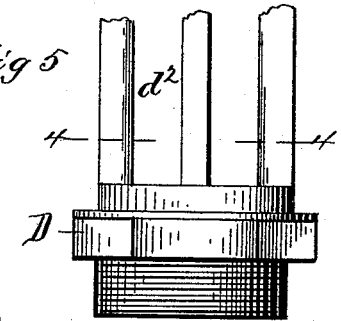
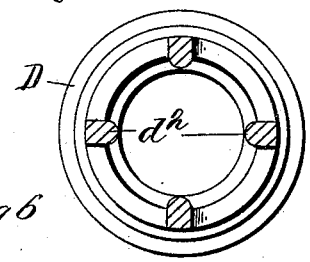
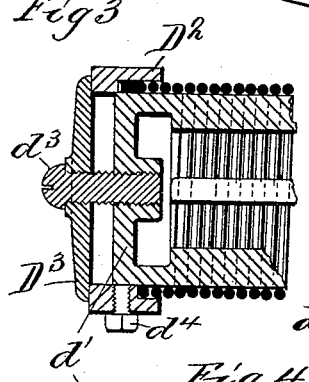
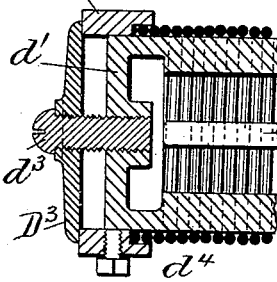
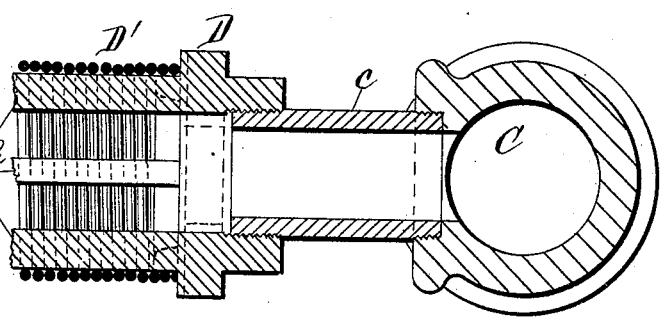
Witnesses
W. C. Corlies
A. M. Best
Inventors
C. B. Davis and E. H. Riddell
By Ledburn & Thacher
Attys (No Model.) 6 Sheets—Sheet 3.

C. B. DAVIS & E. H. RIDDELL.
FILTER.

No. 450,223. Patented Apr. 14, 1891.

Witnesses
W. C. Corliss
A. M. Best

Inventors
Chester B. Davis
Edward H. Riddell
By Cedsum & Thacher
Attys

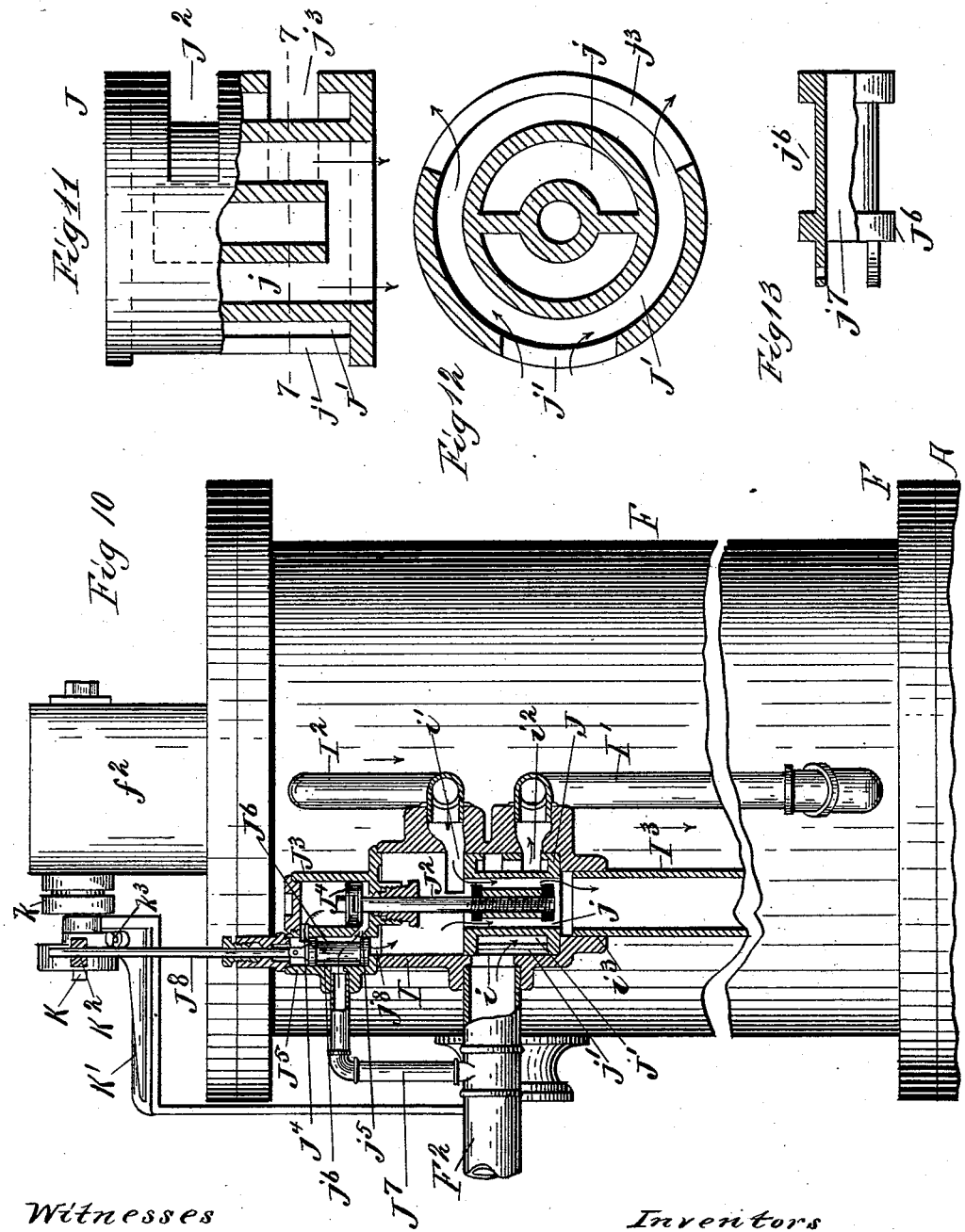

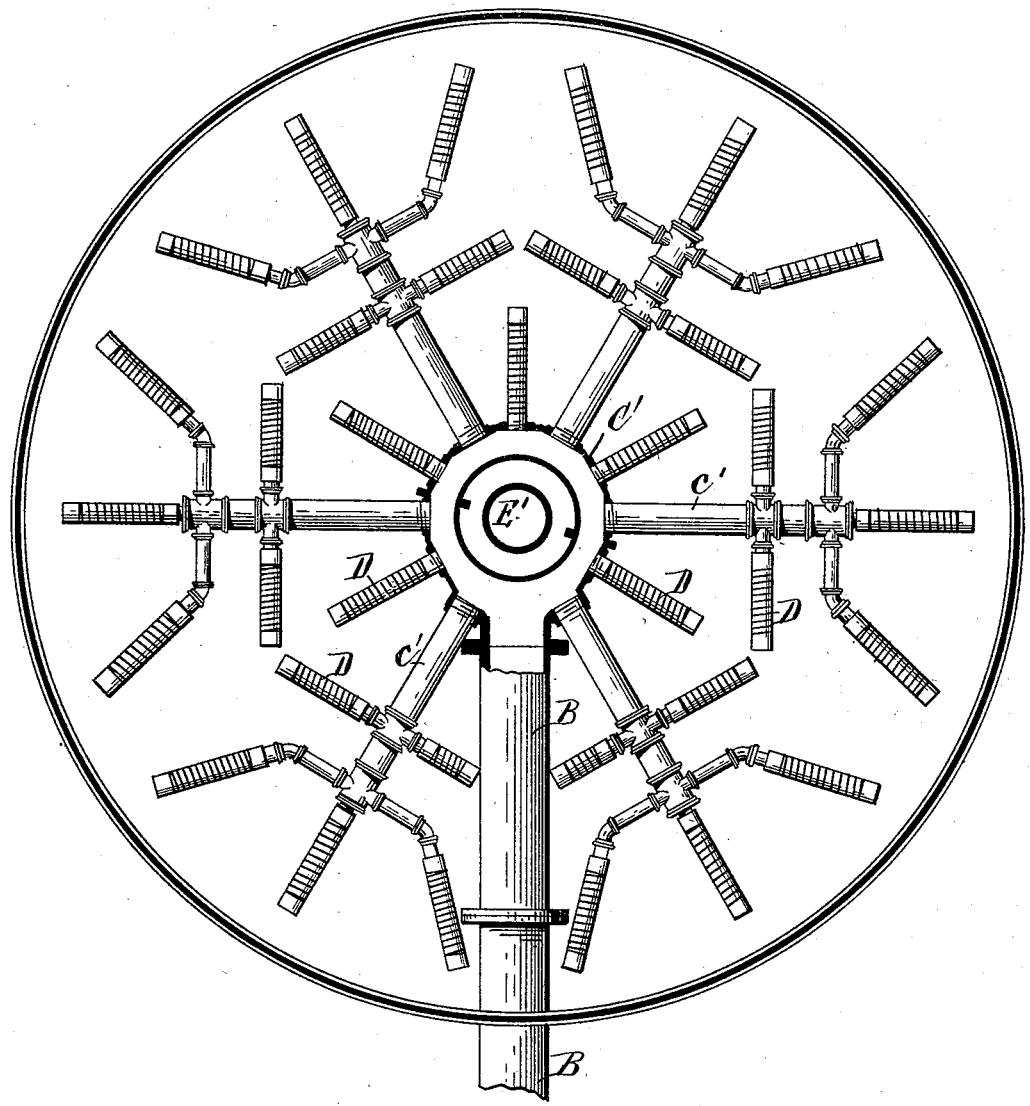

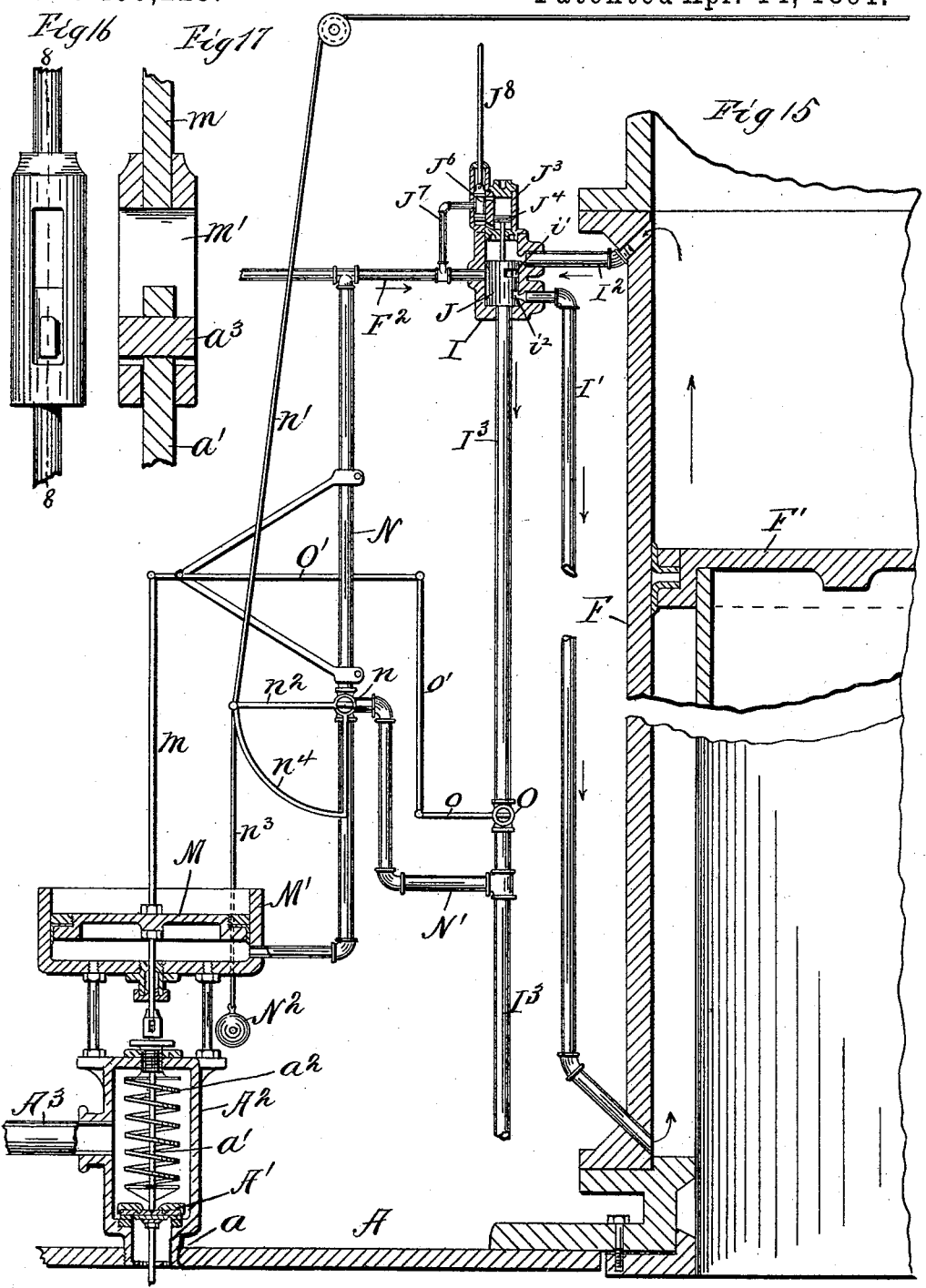

| # UNITED STATES PATENT OFFICE.

CHESTER B. DAVIS AND EDWARD H. RIDDELL, OF CHICAGO, ILLINOIS.

FILTER.

SPECIFICATION forming part of Letters Patent No. 450,223, dated April 14, 1891.

Application filed May 6, 1889. Serial No. 309,794. (No model.)

*To all whom it may concern:*

Be it known that we, CHESTER B. DAVIS and EDWARD H. RIDDELL, citizens of the United States, residing at Chicago, in the county of Cook and State of Illinois, have invented a certain new and useful Improvement in Water-Filters, which is fully set forth in the following specification, reference being had to the accompanying drawings, in which—

Figures 1, 18:
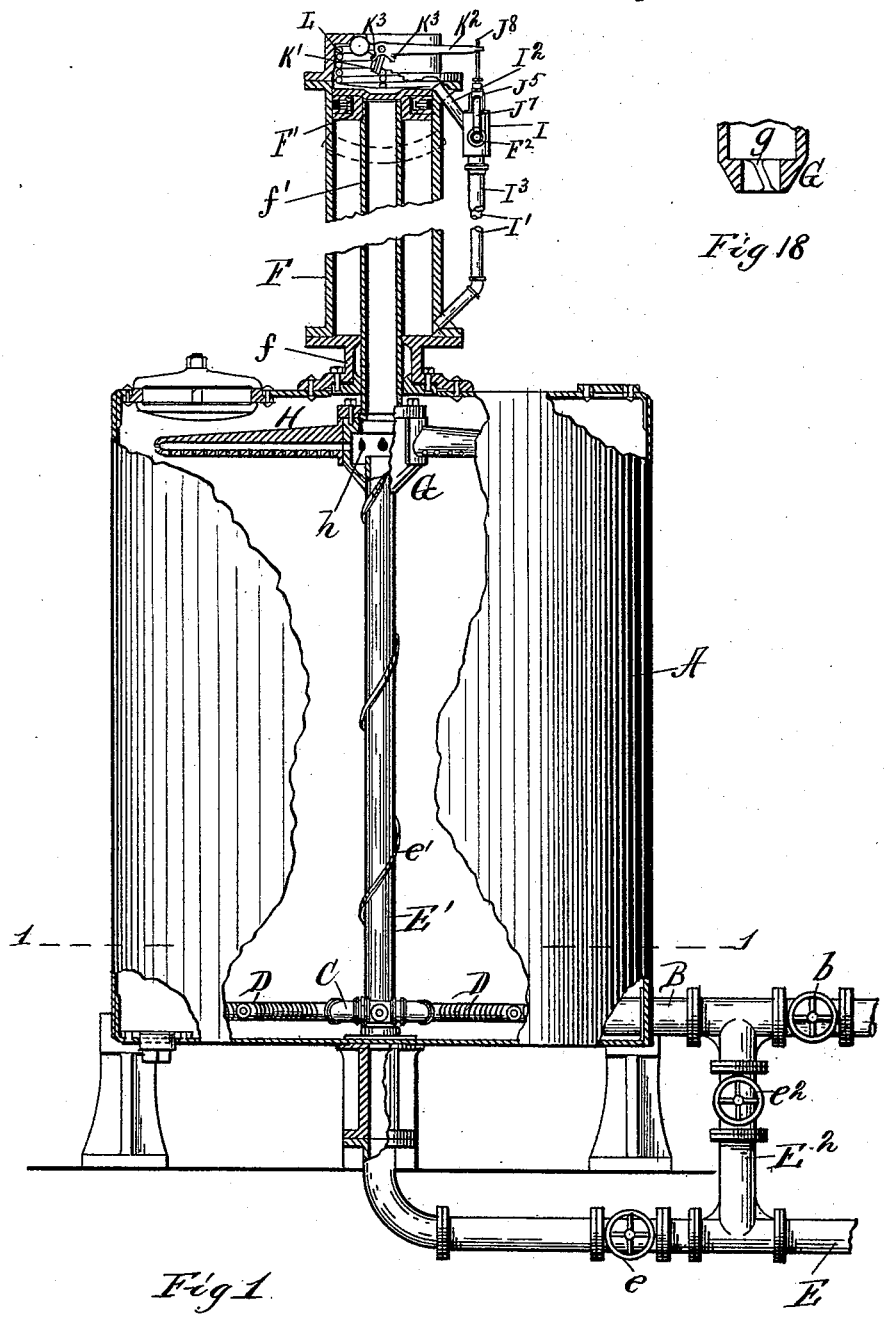
Figure 7:
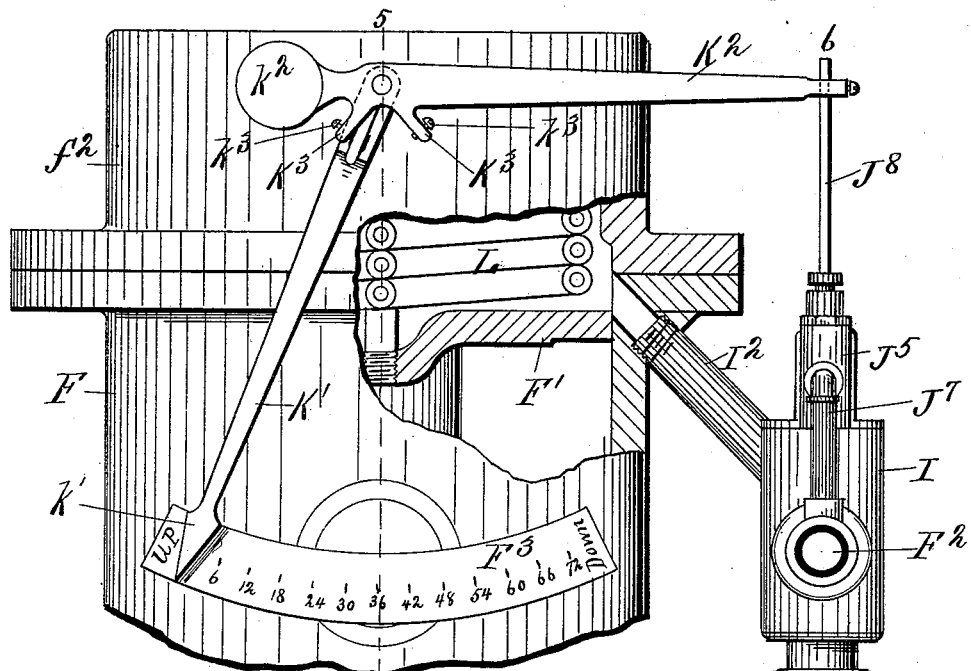
Figure 8:
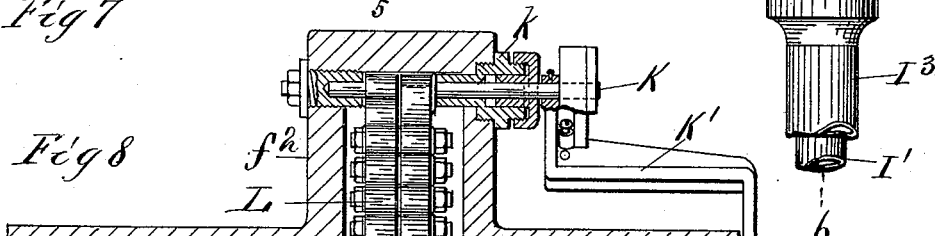
Figure 9:
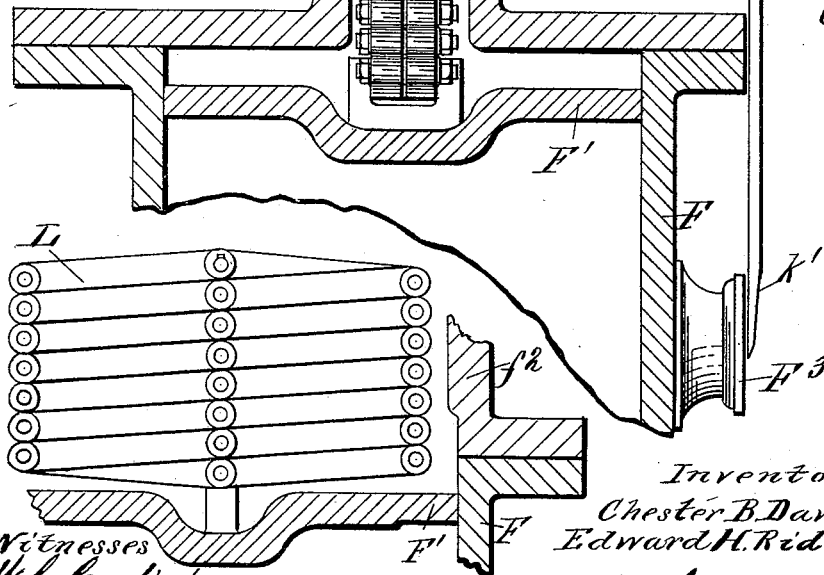

Figure 1 is an elevation, partly in section, of an apparatus embodying our invention; Fig. 2, a plan section of the same, taken on the line 1 1 of Fig. 1; Fig. 3, a detail sectional view taken on the line 2 2 of Fig. 2; Fig. 4, a similar view taken on the line 3 3 of Fig. 2; Fig. 5, a detail elevation of the slotted tube or cage detached; Fig. 6, a plan section of the same, taken on the line 4 4 of Fig. 5; Fig. 7, an elevation, partly in section, of the upper portion of the actuating mechanism; Fig. 8, a sectional view taken on the line 5 5 of Fig. 7; Fig. 9, a detail sectional view showing the lazy-tongs; Fig. 10, a sectional view taken on the line 6 6 of Fig. 7; Fig. 11, a detail elevation, partly in section, of the controlling-valve detached; Fig. 12, a plan section of the same, taken on the line 7 7 of Fig. 11; Fig. 13, an elevation, partly in section, of the auxiliary valve detached; Fig. 14, a plan view showing the arrangement of the pure-water collector in a filter of large size; Fig. 15, an elevation, partly in section, of the controlling mechanism; Fig. 16, an elevation showing the connection between the upper end of the safety-valve stem and the lower end of the piston-rod of its operating-piston; Fig. 17, a sectional view of the same, taken on the line 8 8 of Fig. 16; and Fig. 18, a detail sectional view of the distributer-hub.

Like letters refer to like parts in all the figures of the drawings.

Our invention relates to filtering apparatus, and more particularly to that class of filtering apparatus which is adapted to the filtration of large quantities of water by passing the same under pressure through a bed of suitable filtering material contained within a closed tank.

Our present invention is in the nature of an improvement upon the apparatus set forth in two prior applications filed by us December 17, 1887, No. 258,241, and December 14, 1888, No. 293,653, and the particular features of novelty which constitute the present improvements will be first hereinafter described, and then particularly pointed out in the claims.

In the drawings, in which we have shown a construction embodying our invention in one form, A represents the tank of a filtering apparatus, which is a closed tank of any suitable construction. This tank is filled about two-thirds full, more or less, with sand, gravel, or other suitable filtering material. At the bottom of the tank is a pure-water collector, by means of which the water, after it has been filtered, is collected and conducted to the discharge-pipe B. In the form of collector shown in Fig. 2, which is one adapted to a filter of moderate size, the collecting-pipe C is approximately circular and communicates directly with the discharge-pipe B, and is provided with strainers D, constructed in detail in the manner shown in Figs. 3 to 6, inclusive. The body of each strainer is composed of a slotted tube or cage consisting of a base $d$ and end piece $d'$, connected by longitudinal bars $d^2$. The base $d$ is threaded either externally, as shown in Fig. 3, to screw directly into the collecting-pipe C, or internally, as shown at Fig. 4, in which latter case it is connected to the collecting-pipe C by a suitably-threaded nipple $c$, which screws at one end into said base and at the other end into the collecting-pipe.

$D'$ represents a coiled spring inclosing that portion of the tube or cage which is composed of the bars $d^2$, and having one of its ends secured to the base $d$, while its other end is secured to a sleeve or collar $D^2$, mounted on the end piece $d'$, and free to slide thereon.

$D^3$ represents a cap, which bears upon the sleeve or collar $D^2$, and which may be adjusted to adjust the said sleeve or collar by means of a screw $d^3$, passing through said cap and screwing into a suitably-threaded aperture in the end piece $d'$. The collar $D^2$ is provided with a set-screw $d^4$, by means of which it may be clamped to the end piece after adjustment. It will be seen that by adjusting the collar or sleeve $D^2$, through the medium of the cap, the coils of the spiral spring $D'$ may be brought closer to or farther from each other, and thereby correspondingly decrease or increase the size of the passage through which the water has to pass in order to enter the interior of the strainer. It will be observed that this contraction or expansion is obtained by the direct compressing action, and not by torsional action upon the spring, so that the increase or diminution in the size of the passage between the convolutions of the spring is equal throughout its length.

E represents the supply-pipe, which is extended under the tank to the center thereof, where it is connected to the inlet-pipe $E'$, which extends centrally upward within the filter-tank to a point somewhat above the top of the filter-bed. In the present instance the supply-pipe is shown arranged just below the discharge-pipe B and is connected with the same by a short branch pipe $E^2$, provided with a valve $e^2$, by means of which communication between the two pipes may be opened or closed, as desired. The discharge-pipe B is provided with a valve $b$ at a point beyond the connection with the branch pipe $E^2$ and the supply-pipe E is provided with a valve $e$, located between the filter-tank and the junction of the supply-pipe with the branch pipe $E^2$. The inlet-pipe $E'$ is provided with a rib or spline $e'$, which is wound spirally around the said pipe from top to bottom, as shown in Fig. 1. This inlet-pipe is of course open at its upper end, so as to deliver water into the tank in the manner hereinafter described.

F represents a cylinder mounted upon the top of the tank, at the center thereof, and communicating therewith through a suitable stuffing-box $f$ at its lower end, the upper end of the said cylinder being closed. $F'$ represents a piston arranged within said cylinder and provided with a hollow stem $f'$, which passes through the stuffing-box $f$, that extends downward into the tank A, said hollow stem being of sufficient internal diameter to pass freely over the inlet-pipe $E'$ and at the same time leave a space between the said pipe and stem for the passage of water. This stem is open at its lower end, and there is mounted thereon a hollow hub G, connected thereto in the manner set forth in our application filed December 14, 1888, No. 293,653 so that it will be carried up and down by the movement of said stem, but is free to rotate around the same. This hub is provided with a spiral groove $g$, which is adapted to receive the spiral rib $e'$ on the inlet-pipe $E'$. A series of hollow arms H, perforated on their under side, extend out radially from said hub, with the interior of which they communicate through the apertures $h$ in the side of the latter, as shown. Now it is evident that if the piston $F'$, with its stem $f'$, is moved up and down it will force the radial distributer up and down within the tank, and at the same time the distributer will be caused to revolve by reason of the engagement of the spiral groove on its hub with the spiral rib on the inlet-pipe. The mechanism by means of which this vertical movement is obtained is as follows:

$F^2$ represents a pipe, by means of which water under pressure is supplied to the hydraulic cylinder F. This pipe opens into the side of a valve-casing I through a port $i$, and on the opposite side of said valve-casing are provided ports $i'$ and $i^2$, communicating, respectively, with pipes $I'$ and $I^2$, the former of which leads to the bottom of the hydraulic cylinder and the latter to the top thereof. At one end of the valve-casing I is a port $i^3$, which communicates with a waste-pipe $I^3$, by means of which the exhaust-water may be discharged from the apparatus. Within the valve-casing I is a slide-valve J, having a passage $j$ therein through its center from end to end. This valve may thus be said to be annular in form, and within its annular body is formed a circular passage $J'$, passing entirely around the same. At a point opposite the port $i$ of the valve-casing there is formed in this valve an elongated port $j'$, by means of which communication is maintained between the port $i$ and the passage $j'$. At the opposite side the valve J is provided with ports $j^2$ and $j^3$, by means of which communication may be established between the ports $i'$ and $i^2$ and the passage $J'$, respectively, according to the position of the valve.

$J^2$ indicates a stem attached to the valve J and passing through the end of the valve-casing I into a cylinder $J^3$, its end within said cylinder being provided with a piston $J^4$, fitting the said cylinder.

$J^5$ indicates a valve-chamber arranged adjacent to the cylinder $J^3$ and communicating therewith by ports $j^4$ and $j^5$ at each end.

$J^6$ indicates a valve fitting within the valve-chamber $J^5$ and provided with a groove or passage $j^6$, passing around its body externally and within a central waste-passage $j^7$, formed through its body longitudinally.

$J^7$ indicates a branch pipe leading from the pipe $F^2$ to the valve-chamber $J^5$ and opening into the same through a suitable port, by which it communicates with the passage $j^6$. A waste-passage $j^8$ forms a communication between the end of the valve-chamber $J^5$ and the valve-casing I.

$J^8$ indicates a stem connected to the valve $J^6$, by means of which said valve is operated through the mechanism hereinafter described.

Upon the upper portion of the cylinder there is formed a chamber $f^2$, through which extends from front to rear a shaft K, the front end of which projects outward beyond said chamber, passing through a stuffing-box K at the point where it emerges from the same. Upon the projecting portion of this shaft there is secured an arm $K'$, which is bent outward and downward, as shown, its lower end being shaped to form a pointer $k'$ to act in conjunction with a scale $F^3$, mounted on the front end of the cylinder F, and over the graduated arc of which the said pointer travels.

In front of the arm J' there is mounted loosely upon the shaft K a second arm $K^2$, the end of which is suitably connected to the valve-stem $J^3$, toward which the said arm extends laterally, a suitable counterpoise $k^2$ being provided at the other end of said arm to balance the same. From the arm $K^2$, at the point where it is mounted on the shaft, projections $K^3$ extend diagonally downward at an angle of about forty-five degrees to each other, so as to embrace between them the arm K', and are provided with regulating-screws $k^3$, with which said arm comes in contact at the limits of its motion in one direction or the other. The shaft K is rocked from the piston F through the medium of lazy-tongs L, which, when closed, occupy the space within the chamber $f^2$, the upper member thereof being secured to the shaft K, while the lower member is secured to the piston F. The tank A is provided in its upper side with an outlet-aperture $a$, closed by a valve A', provided with a stem $a'$, and inclosed in a casing $A^2$, a spring $a^2$ acting upon the said valve to hold it normally downward on its seat, so as to close the aperture $a$.

$A^3$ indicates an overflow-pipe leading from the casing $A^2$ to any suitable point of discharge. The valve-stem $a'$ is continued upward through the top of the casing $A^2$, and is there connected to the piston-rod $m$ of a piston M, inclosed within a cylinder M'. The connection between the piston-rod and valve-stem is effected in the manner shown in detail in Figs. 16 and 17, the said rod being provided with a slotted extension $m'$, into which the upper end of the valve-stem $a'$ extends, and within which it is provided with a transverse pin $a^3$, so that the connection between said valve-stem and said piston-rod is a yielding one, whereby the valve A' is permitted to yield upward independently of the piston, but will be carried up positively when the piston is moved upward.

The piston M is operated by means of a pipe N, which is connected to the supply-pipe $F^2$, through which the water under pressure is conducted to the hydraulic operating mechanism. This pipe N is provided with a three-way valve $n$, from which a branch pipe N' leads to the waste-pipe $I^3$. The valve $n$ is operated by a cord $n'$, connected to the valve-arm $n^2$, said cord passing over suitable pulleys and being conducted to the point from which it is desired to operate the mechanism.

$N^2$ indicates a counterpoise-weight connected by a cord $n^3$ to the valve-arm $n^2$, which latter is provided with an arm $n^4$, upon which said cord may bear to prevent shifting of the position of the counterpoise-weight.

The waste-pipe $I^3$ is provided, at a point above its junction with the pipe N', with a valve O, the arm $o$ of which is connected by a link $o'$ to one end of a lever O', the other end of which is connected to the upward prolongation of the piston-rod $m$.

In Fig. 14 of the drawings we have shown a modified form of pure-water collector adapted for use in filters of large dimensions. In this construction the discharge-pipe B is connected to a central annular hollow casting C', from which pipes $c'$ radiate outward, the strainers D being connected to said radial pipes and likewise directly to the casting C' in such manner as to cover the entire bottom of the filter. The casting C' is made annular in form in order that the inlet-pipe E' may extend centrally upward through the same in the manner shown.

The operation of the apparatus is as follows: When the ordinary operation of filtering is going on, the water enters through the supply-pipe E and, passing up through the inlet-pipe E', enters the hollow stem $f'$ or its hub G, according to the position of the parts, passing thence into the radial arms H, through the perforations of which it is forced outward into the filter-tank. It then passes down through the filtering material in said tank, and is collected at the bottom thereof, entering the collector through the strainers D, these latter being so adjusted as to prevent the sand or other filtering material from passing through along with the filtered water. From the collector the filtered water is carried off through the discharge-pipe B to any desired point where it is to be used. When it is desired to wash the filter-bed, the hub G, along with the radial arms H, is forced downward through the filtering material, by the mechanism provided for that purpose, and during this downward movement the water will be forced out through the perforations of said arms and will stir up and thoroughly agitate the filtering material, at the same time thoroughly washing the same and cleansing it of impurities. During this downward movement the said arms rotate around the inlet-pipe as a center, owing to the engagement of the spiral rib on said inlet-pipe with the corresponding groove in the hub, and this rotary motion not only greatly increases the cleansing action of the water by more thoroughly stirring up the filtering material, but it also causes the same to operate upon all portions of the filtering-bed in turn, so that the efficiency of the washing is greatly increased. If desired, the entire bed may be washed at once, the distributer passing downward and upward through the same as often as is necessary, its movement being automatically reversed at the end of its travel in each direction in the manner hereinafter described. We also contemplate, however, so using the device that when the upper portion of the filter-bed becomes impure the distributer shall be forced downward sufficiently far to pass below this impure portion and be there stopped until further downward movement is necessary. The filter-bed may thus be gradually used from top to bottom and then washed in the manner hereinbefore described. During the operation of washing the valve $b$ is closed and the dirty water passes off, along with the impurities, through the opening $a$. If necessary, the valve $e^2$ may be opened and the water forced in a reverse direction through the discharge-pipe B and through the collector, passing out through the strainers D and then up through the filter-bed, thus not only cleaning out the collector and strainers, but also aiding materially in the cleansing of the filter-bed. During this operation the valve $e$ may be either closed or partially or wholly opened, as desired; or, in other words, the washing may be done entirely through the distributer, which, in any case, does the greater portion of the work, or partly through the distributer and partly through the collector, and in this latter case either simultaneously or successively.

The mechanism for actuating the distributer operates in the following manner: Let it be supposed that the parts are in the position shown in Fig. 15 of the drawings, in which position they are stationary. A pull upon the cord $n'$ will move the arm $n^2$ upward, and thereby open the valve $n$, thus allowing the water under pressure to pass from the pipe $F^2$ through the pipe N into the cylinder $M'$. This will cause the piston M in said cylinder to move upward, thereby lifting the valve $A'$ from its seat, and thus opening the outlet-aperture $a$. At the same time this upward motion of the piston M opens the valve O through the medium of the levers $O'$ and $o$ and the link $o'$. The valve O being thus opened, the water on the upper side of the piston $F'$ is permitted to escape, passing through the pipe $I^2$ into the valve-casing I and through the passage $j$ in the valve J, by means of which it reaches the port $i^3$ and passes out through the waste-pipe. Water under pressure at the same time enters through the pipe $F^2$, and, passing through the ports $i$ and $j'$, enters the passage $J'$ in the valve J, passing thence through the ports $j^3$ and $i^2$ into the pipe $I'$. By this latter pipe it is conducted to the lower end of the cylinder, and, acting upon the piston $F'$ therein, imparts an upward motion to the same. Now it will be observed that the piston $F'$ is connected to the shaft K by means of the lazy-tongs L, and as the piston moves in the cylinder each member of the lazy-tongs will assume an inclined position corresponding in its angle to the position which the piston occupies within the cylinder, being nearly horizontal when the piston is at the top of the cylinder and approaching more nearly to the vertical as the distance of the piston from the top of the cylinder increases. The upper member of the lazy-tongs L, being secured to the shaft K, will rock said shaft either in one direction or the other as the piston $F'$ moves up or down, and will cause a corresponding vibration of the arm $K'$, which is attached to the projecting front end of said shaft, which vibration will be made evident by the travel of the pointer $k'$ of said arm over the graduated arc $F^3$. The arm $K'$ is so mounted on the shaft K that when the piston $F'$ is at the upper limit of its motion the pointer $k'$ will be at one end of the graduated arc $F^3$, and at the other end of said arc when the piston is at the lower limit of its motion, the ends of said arc being properly marked and the intervening space graduated, so that the pointer $k'$ will always indicate the exact position of the piston $F'$ within the cylinder F.

Returning now to the upward motion of the piston $F'$ previously described, as the said piston reaches the upward limit of its motion the shaft K is so turned that the arm $K'$ thereon strikes against one of the projections $K^3$ on the arm $K^2$, or, more properly speaking, against the adjusting-screw $k^3$ of said projection. The arm $K'$ continuing to move a short distance, the arm $K^2$ is vibrated, and thereby, through its connection with the valve-stem $J^8$, moves the valve $J^6$ over to the other end of the valve-chamber $J^5$. The water then passes through the pipe $J^7$ into the groove $j^6$, around the valve $J^6$, and through the port $j^5$ into the cylinder $J^3$. Its pressure is there exerted upon the piston $J^4$, so as to move the valve J up into such a position as to bring the port $j^3$ opposite the port $i^2$, and at the same time bring the port $i'$ into direct communication with the interior of the valve-casing I. During the motion of the piston $J^4$ the waste or dead water escapes through the port $j^6$ into the valve-chamber $J^5$, and thence through the port $j^8$ into the valve-casing I. This change in the position of the valve J causes the water under pressure to pass into the pipe $I^2$ and thence to the top of the cylinder F, whereby the piston $F'$ is forced downward, the water below said piston passing out through the pipe $I'$ and thence through the valve-casing to the waste-pipe $I^3$. The dead-water from the valve-chamber $J^5$ passes out through the passage $j$ in the valve J to the said waste-pipe. The downward motion thus imparted to the piston $F'$ continues until this latter has reached the lower limit of its motion, just previous to which time the arm $K'$ strikes the other projection $K^3$ of the arm $K^2$, and, actuating said arm $K^2$, so moves it as to turn the parts to the position shown just as the piston reaches the lower limits of its motion. It will be at once seen that this reciprocating motion thus imparted to the piston $F'$ may be continued indefinitely as long as the valve O is held open, the distributer being carried thereby up and down through the filter-bed to wash the same, while the wash-water will escape through the opening $a$, valve-chamber $A^2$, and waste-pipe $A^3$. This motion of the piston may be arrested at any time by releasing the cord $n'$, when the counter-weight $N^2$ will return the arm $n^2$ to the position shown in the drawings, thereby so turning the three-way valve $n$ as to close the communication between the pipe $F^2$ and the cylinder $M'$ and open the communication between said cylinder and the pipe $N'$. The water in the cylinder $M'$ then escapes through the pipe $N'$ to the waste-pipe $I^2$, allowing the piston M to fall and simultaneously close the valves $A'$ and O, thereby arresting the movement of the piston $F'$ and closing the outlet $a$. The valve $A'$ also operates as a safety-valve in case of any excess of pressure in the tank from any cause, as it will be seen that the said valve may yield upward independently of the piston M, owing to the loose connection between its stem and the piston-rod. The spring $A^2$ serves, of course, to hold the valve $A'$ normally to its seat and to return the same thereto after the pressure has fallen sufficiently.

It is obvious that our invention is not limited to the particular details set forth in the specification and shown in the drawings. For instance, other mechanism than that described may be employed to impart vertical movement to the distributer or to rotate the same, although we prefer the mechanism which we have devised for this purpose. Moreover, various modifications in the details of construction and in the arrangement of the parts will readily suggest themselves; and we therefore do not wish to be understood as limiting ourselves strictly to the precise details hereinbefore described, and shown in the drawings.

Having thus described our invention, what we claim as new, and desire to secure by Letters Patent, is—

1. In a water-filter, the filter-tank, in combination with a series of vertically-movable delivery-pipes arranged within the tank, perforated as described, and operating devices whereby said pipes may be moved up and down through the filter-bed within the tank and at the same time continuously rotated to wash the filter-bed without removing from the tank, substantially as and for the purposes specified.

2. In a water-filter, the combination, with an inlet-pipe, of a vertically-movable distributer provided with delivery-arms perforated as described, means for continuously rotating said arms, and an inclosing tank, substantially as and for the purposes specified.

3. In a water-filter, the combination, with the tank, of the inlet-pipe having a spiral flange or rib, and the vertically-movable distributer provided with a hub having distributing-arms, perforated as described, and having a spiral groove to engage said flange or rib to rotate the hub and arms, substantially as and for the purposes specified.

4. In a water-filter, the combination, with the filter-tank and the inlet-pipe provided with a spiral rib, of the hollow stem provided with a hub having perforated distributing-arms and a groove to fit said rib, and operating mechanism connected to said stem to impart to the same an automatic motion of vertical reciprocation, substantially as and for the purposes specified.

5. In a water-filter, the combination, with the distributer and the hydraulic cylinder provided with a piston connected to said distributer to operate the same, of an indicator connected to and operated by said piston, substantially as and for the purposes specified.

6. In a water-filter, the combination, with the distributer and the hydraulic cylinder provided with a piston connected thereto to operate the same, of a rock-shaft provided with an indicator-arm, a co-operating graduating arc or scale, and connecting devices between said shaft and piston, whereby said shaft is rocked, substantially as and for the purposes specified.

7. In a water-filter, the combination, with the distributer and the hydraulic cylinder provided with a piston for operating the same, of a valve controlling said cylinder, an arm connected to said valve to shift the same, and a rock-shaft connected to the piston by lazy-tongs and provided with an arm adapted to engage the valve-shifting arm at the limits of its motion, substantially as and for the purposes specified.

8. In a water-filter, the combination, with the cylinder and the piston arranged therein, of the controlling-valve, the rock-shaft K, the lazy-tongs L, connecting said rock-shaft and the piston, the arm $K'$, secured on said rock-shaft, and the arm $K^2$, mounted loosely on the rock-shaft, connected to the controlling-valve and provided with projections $K^3$, with which the arm $K'$ engages, substantially as and for the purposes specified.

9. In a water-filter, the combination, with the filter-tank provided with an outlet and a valve controlling the same, of the distributer, a hydraulic cylinder provided with a piston connected to said distributer to operate the same and a valve to start and stop the operation thereof, and an auxiliary hydraulic cylinder provided with a piston connected to both valves, whereby said valves may be simultaneously opened and closed, substantially as and for the purposes specified.

10. The combination, with the pressure-pipe $F^2$ and waste-pipe $I^3$, connected through valve mechanism with the upper and lower ends of cylinder F, of the auxiliary cylinder $M'$, the pipe N, connecting said cylinder with the pressure-pipe, the branch pipe $N'$, connecting the pipe N and the waste-pipe, the valve O, connected by levers with the piston of the cylinder $M'$, and the three-way valve $n$, arranged at the junction of the pipes N and $N'$, substantially as and for the purposes specified.

11. The combination, with the filter-tank having outlet $a$, of the spring-controlled valve A′, the cylinder M′, provided with a piston M, the piston-rod of which is loosely connected to the stem of the valve A′, substantially as and for the purposes specified.

12. In a water-filter, the combination, with the slotted tube composed of a base $d$ and end piece $d'$, connected by longitudinal bars $d^2$, of the coiled spring D′, surrounding said tube, the sleeve or collar $D^2$, mounted loosely on the end piece, and the cap $D^3$, provided with an adjusting-screw $d^3$, screwing into the end piece, substantially as and for the purposes specified.

CHESTER B. DAVIS.
EDWARD H. RIDDELL.

Witnesses to signature of Chester B. Davis:
IRVINE MILLER,
CARRIE FEIGEL.

Witnesses to signature of Edward H. Riddell:
THEODORE F. COLBURN,
P. F. MITCHELL.